US009510173B2

United States Patent
Cai et al.

(10) Patent No.: US 9,510,173 B2
(45) Date of Patent: Nov. 29, 2016

(54) FILTERING EMERGENCY BROADCAST MESSAGES THAT CONTAIN COMMERCIAL CONTENT

(71) Applicant: Alcatel-Lucent USA Inc., Murray Hill, NJ (US)

(72) Inventors: Yigang Cai, Naperville, IL (US); Anil Rao, Redmond, WA (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/628,243

(22) Filed: Feb. 21, 2015

(65) Prior Publication Data

US 2016/0249192 A1    Aug. 25, 2016

(51) Int. Cl.
*H04M 11/04*    (2006.01)
*H04W 4/22*    (2009.01)
*H04W 84/04*    (2009.01)

(52) U.S. Cl.
CPC ............ *H04W 4/22* (2013.01); *H04W 84/042* (2013.01)

(58) Field of Classification Search
CPC ...................................................... H04W 4/22
See application file for complete search history.

(56) References Cited

U.S. PATENT DOCUMENTS

| | | | | |
|---|---|---|---|---|
| 2010/0075626 | A1* | 3/2010 | Titus | H04W 76/007 455/404.1 |
| 2010/0124898 | A1* | 5/2010 | Qu | H04W 4/14 455/404.1 |
| 2011/0081883 | A1* | 4/2011 | Daly | H04L 12/1895 455/404.1 |
| 2012/0250501 | A1* | 10/2012 | Lee | H04W 76/007 370/229 |
| 2015/0249952 | A1* | 9/2015 | Lee | H04W 4/06 370/312 |

OTHER PUBLICATIONS

3rd Generation Partnership Project, Evolved Universal Terrestrial Radio Access (E-UTRA); Radio Resource Control (RRC); Protocol specification (Release 12) 3GPP TS 36.331 V12.4.1 (Dec. 2014).
3rd Generation Partnership Project, Cell Broadcast Centre interfaces with the Evolved Packet Core, Stage 3 (Release 12), 3GPP TS 29.168 V12.7.0 (Dec. 2014).
3rd Generation Partnership Project, Evolved Universal Terrestrial Radio Access Network (E-UTRAN); S1 Application Protocol (S1AP) (Release 12) 3GPP TS 36.413 V12.4.0 (Dec. 2014).
3rd Generation Partnership Project, Public Warning System (PWS) requirements (Release 12), 3GPP TS 22.268 V12.2.0 (Jun. 2013).
3rd Generation Partnership Project; Group based Enhancements (Release 13), 3GPP TR 23.769 V1.0.0 (Dec. 2014).

* cited by examiner

*Primary Examiner* — Sam K Ahn
*Assistant Examiner* — Fabricio R Murillo Garcia
(74) *Attorney, Agent, or Firm* — Duft Bornsen & Fettig, LLP

(57) ABSTRACT

Systems and methods for filtering emergency broadcast messages. One embodiment is User Equipment (UE) that store rules for filtering emergency broadcast messages. The UE receives an emergency broadcast message over a paging channel of a mobile network, identifies a class indicator assigned to the emergency broadcast message, selects one of the rules based on the class indicator assigned to the emergency broadcast message, and determines whether the emergency broadcast message is authorized for presentation on the UE based on the rule. The UE then ignores the emergency broadcast message responsive to a determination that the emergency broadcast message is not authorized for presentation.

18 Claims, 4 Drawing Sheets

| CLASS OF RULES | |
|---|---|
| CLASS ID | RULE |
| 0 | PROCESS MESSAGE IN A NORMAL FASHION |
| 1 | IGNORE MESSAGE |
| 2 | PROCESS MESSAGE BASED ON THE SENDING APPLICATION, MESSAGE TYPE, UE TYPE, OR OTHER CONDITIONS |

FILTERING EMERGENCY BROADCAST MESSAGES THAT CONTAIN COMMERCIAL CONTENT

FIELD OF THE INVENTION

The invention is related to the field of communication systems and, in particular, to filtering commercial messages that are broadcast through an emergency alerting service.

BACKGROUND

Emergency alerting services are used to broadcast emergency information to mobile devices located in certain geographic areas. For example, emergency alerting services may be used to broadcast emergency weather information (e.g., tornado, flash flood, hurricane, etc.), threats against public safety, AMBER alerts, etc., to mobile devices within a geographic area. A governmental entity, such as the National Weather Service (NWS), Federal Emergency Management Agency (FEMA), and the National Center for Missing and Exploited Children (NCMEC), generates an alert for an area, and sends the alert to a participating service provider. An infrastructure within the provider's network then broadcasts the alert over the mobile network to subscribers in the affected area. The alerts are delivered as messages similar to text messages. Emergency alerting services in the United States are referred to as Wireless Emergency Alerts (WEA) or the Commercial Mobile Alert System (CMAS).

Service providers are able to broadcast commercial advertisements to mobile devices using the infrastructure for the emergency alerts. For example, instead of just sending emergency alerts over the infrastructure, a service provider may contract with a commercial entity to broadcast advertisements to mobile devices located within a certain area of the provider's network. Unfortunately, many mobile users may not want to receive commercial advertisements in this manner.

SUMMARY

Embodiments described herein provide a way to filter emergency broadcast messages that include commercial content, such as advertisements. When a service provider uses an emergency alerting service, such as CMAS, to broadcast commercial content to mobile users in an area, the mobile users presently do not have a choice but to receive the commercial content. In the embodiments described herein, the mobile devices (i.e., User Equipment (UE)) of the mobile users are provisioned with rules for filtering emergency broadcast messages. The emergency broadcast messages are also assigned a class indicator that may be mapped to a rule within a mobile device. Therefore, when a mobile device receives an emergency broadcast message, the mobile device identifies a rule for filtering the emergency broadcast message based on its associated class indicator. For example, a rule for an emergency broadcast message that contains an emergency alert may indicate that the emergency broadcast message is processed in a normal manner, while a rule for an emergency broadcast message that contains a commercial advertisement may indicate that the emergency broadcast message is ignored. Because the mobile devices are able to filter certain emergency broadcast messages, mobile users may avoid being bothered by unwanted advertisements that are broadcast in their geographical area.

One embodiment comprises a UE having a controller configured to store rules for filtering emergency broadcast messages. The controller in the UE is configured to receive an emergency broadcast message over a paging channel of a mobile network, to identify a class indicator assigned to the emergency broadcast message, to select one of the rules based on the class indicator assigned to the emergency broadcast message, to determine whether the emergency broadcast message is authorized for presentation on the UE based on the rule. The controller is configured to ignore the emergency broadcast message responsive to a determination that the emergency broadcast message is not authorized for presentation.

In another embodiment, the controller is configured to process the emergency broadcast message responsive to a determination that the emergency broadcast message is authorized for presentation. For instance, the controller may extract content from the emergency broadcast message, and present the content to an end user through a user interface.

In another embodiment, the controller is configured to receive a System information message used in Radio Resource Control (RRC) for the emergency broadcast message, and to ignore System Information Block Type 1 (SIB1) of the System information message responsive to a determination that the emergency broadcast message is not authorized for presentation.

In another embodiment, the controller is configured to receive a paging message from the mobile network for the emergency broadcast message, and to extract the class indicator from the paging message. An extension field may be added to the paging message for the class indicator assigned to the emergency broadcast message.

In another embodiment, the controller is configured to extract the class indicator from SIB1 of the System information message. A SIB1 extension field may be added to the System information message for the class indicator assigned to the emergency broadcast message.

Another embodiment comprises a method for filtering emergency broadcast messages. The method includes storing rules for filtering the emergency broadcast messages within a UE. The method includes receiving an emergency broadcast message in the UE over a paging channel of a mobile network, identifying a class indicator assigned to the emergency broadcast message, selecting one of the rules based on the class indicator assigned to the emergency broadcast message, and determining whether the emergency broadcast message is authorized for presentation on the UE based on the rule. When the emergency broadcast message is not authorized for presentation on the UE, the method includes ignoring the emergency broadcast message. When the emergency broadcast message is authorized for presentation on the UE, the method includes processing the emergency broadcast message in a normal manner, such as for display of the message on the UE.

Another embodiment comprises a UE enabled for Long Term Evolution (LTE) communications. The UE is configured to store a class of rules for filtering CMAS messages. The UE is configured to receive a CMAS message broadcast from an eNodeB, to identify a class indicator assigned to the CMAS message, to select a rule based on the class indicator assigned to the CMAS message, and to determine whether the CMAS message is authorized for presentation on the UE based on the rule. When the CMAS message is not authorized for presentation, the UE is configured to ignore a SIB1 of a System information message received from the eNodeB for Radio Resource Control (RRC). When the CMAS message is authorized for presentation, the UE is configured to process SIB1 of the System information message to identify a System Information Block Type 12 (SIB12), to process SIB12 to extract content for the CMAS message from an upper layer (e.g., a transport layer, such as a TCP or UDP layer), and to display the content through a user interface.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
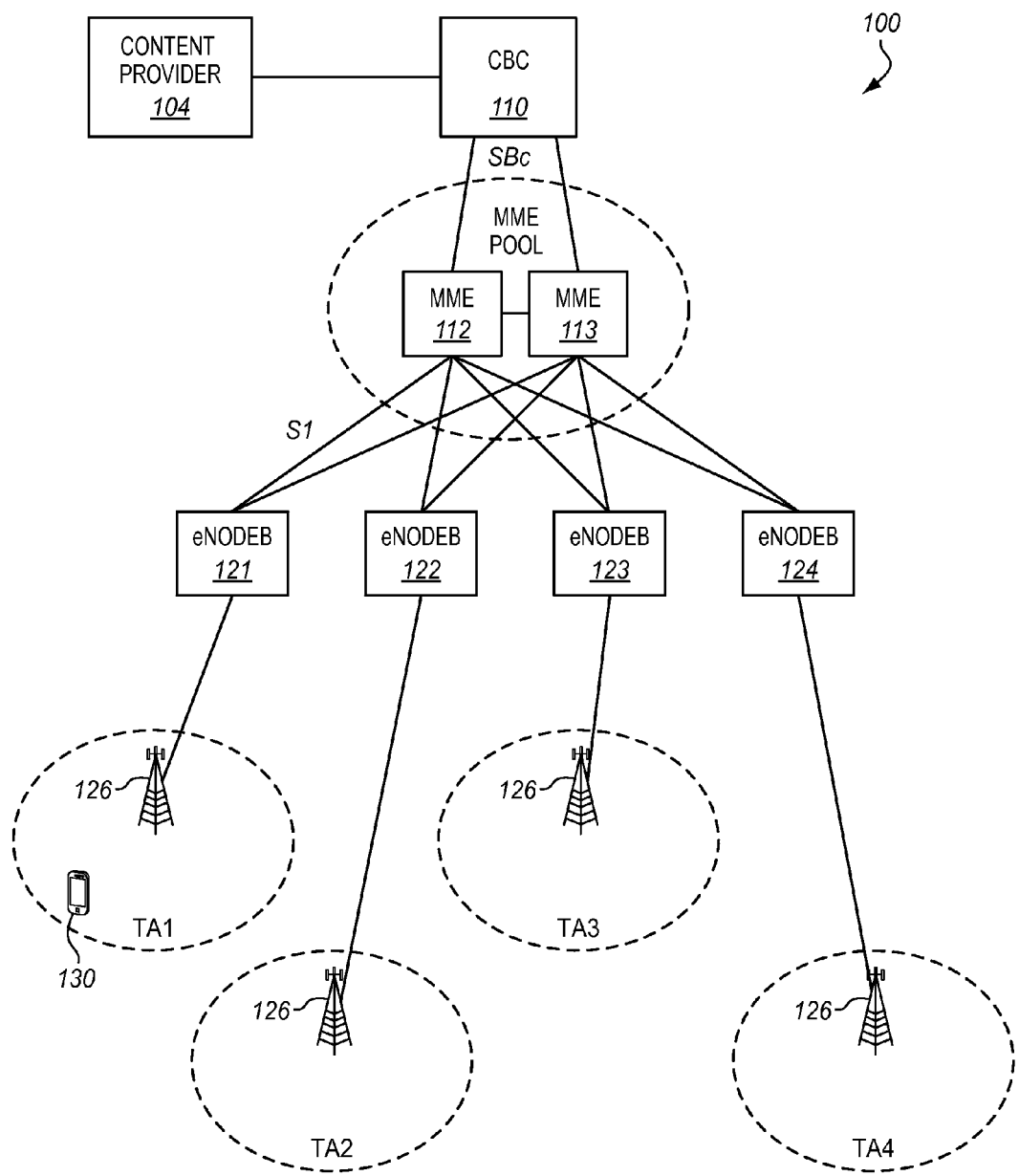
FIG. 1 illustrates a network infrastructure for an emergency alerting service.

FIG. 1 illustrates a network infrastructure 100 for an emergency alerting service, such as CMAS Infrastructure 100 is for an Evolved Packet Core (EPC) of a Long Term Evolution (LTE) system, and is able to broadcast alerts to User Equipment (UE). Infrastructure 100 includes a Cell Broadcast Center (CBC) 110 that connects to one or more content providers 104 that provide content that is to be broadcast to a certain geographical area. CBC 110 is an entity that receives data, information, content, etc., from content providers, and initiates the broadcast of messages to UEs in a particular cell, group of cells, Location Area (LA), Routing Area (RA), Tracking Area (TA), or the entire network. Content provider 104 may represent a governmental entity that provides emergency alerts, such as the NWS, or may be a commercial entity that provides commercial advertisements. CBC 110 also connects to Mobility Management Entities (MME) 112-113 over an SBc reference point. MMEs 112-113 each comprise a server, device, apparatus, or equipment (including hardware) that provides mobility session management, and supports subscriber authentication, roaming, and handovers to other networks Infrastructure 100 also includes a plurality of Evolved NodeBs (also referred to as eNodeB or eNB) 121-124 that connect to MMEs 112-113 over the S1 reference point. The eNodeBs 121-124 are equipment that facilitates wireless communication between UEs and the network. Each eNodeB 121-124 includes a base station 126 (with one or more transceivers) and associated controller to facilitate wireless communication.

Although the infrastructure 100 shown in FIG. 1 is for an EPC network, the concepts described herein for filtering emergency broadcast messages may apply to other types of networks.

Figure 2:
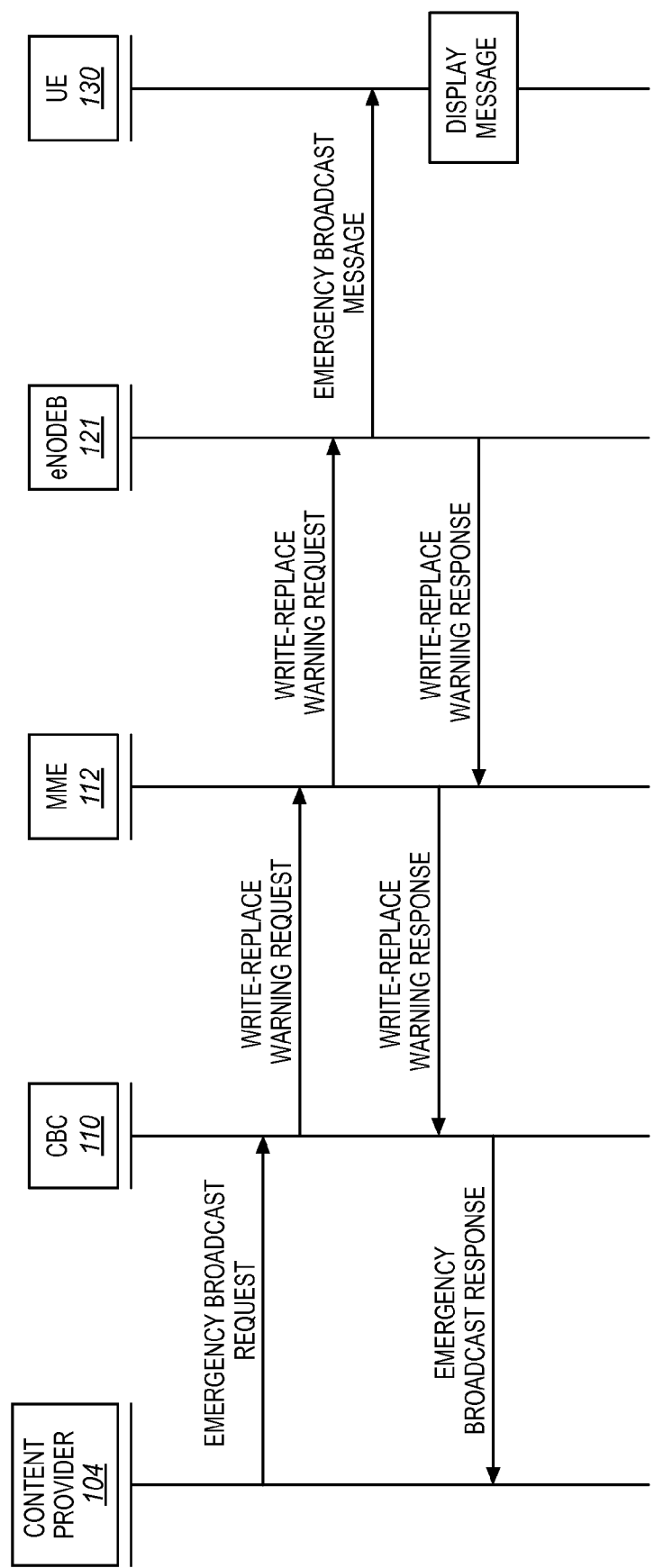
FIG. 2 is a message diagram illustrating an exemplary alerting procedure in infrastructure.

FIG. 2 is a message diagram illustrating an exemplary alerting procedure in infrastructure 100. To begin, content provider 104 sends an emergency broadcast request to CBC 110. The emergency broadcast request includes an emergency broadcast message intended for subscribers in an area of the network. The emergency broadcast message may include any content, data, or information that alerts subscribers of an emergency situation. In response to the request, CBC 110 generates a Write-Replace Warning Request that includes the emergency broadcast message, and sends the Write-Replace Warning Request to MME 112. MME 112 then forwards the Write-Replace Warning Request toward the eNodeB(s) that belongs to the service area defined for the broadcast. For example, if a Global eNodeB identifier (ID) Information Element (IE) is present in the Write-Replace Warning Request, then MME 112 may forward the request only toward the eNodeB identified by the Global eNodeB ID. If the Global eNodeB ID IE is not supported, then MME 112 may forward the Write-Replace Warning Request toward one or more eNodeBs using a List of Tracking Area Identifiers (TAIs) IE (if this list is present). Otherwise, MME 112 may forward the request toward all eNodeBs that are connected to MME 112. In this example, MME 112 forwards the Write-Replace Warning Request toward eNodeB 121.

In response to the Write-Replace Warning Request, eNodeB 121 broadcasts the emergency broadcast message to UE 130. UE 130 is then able to display the content of the emergency broadcast message to an end user. The eNodeB 121 also sends a Write-Replace Warning Response to MME 112.

Traditionally, content provider 104 comprises a governmental entity that generates an emergency alert, such as the NWS. However, a service provider may use the infrastructure discussed above to broadcast commercial content (e.g., advertisements) to UEs instead of just emergency alerts. For example, content provider 104 may represent a commercial entity (e.g., Starbucks™) that sends commercial advertising content to CBC 110. CBC 110 may operate as in FIG. 2 so that the commercial advertising content is broadcast to UEs in a certain service area.

The embodiments described herein provide mechanisms for filtering emergency broadcast messages, such as messages that include commercial content. As an overview, UEs are pre-provisioned with rules for filtering emergency broadcast messages. When an emergency broadcast message is generated in the network (whether for an emergency alert or a commercial advertisement), a class indicator is assigned to the emergency broadcast message. For example, if the emergency broadcast message contains an emergency alert (e.g., AMBER alert), then a class indicator of "0" may be assigned to the message. If the emergency broadcast message contains a commercial advertisement, then a class indicator of "1" may be assigned to the message. The class indicators will specify to UEs how to filter the emergency broadcast messages based on the rules that are stored locally on the UEs.

Assume for this embodiment that content provider 104 in FIG. 1 sends content for an emergency broadcast message to CBC 110. CBC 110 or another entity assigns a class indicator to the emergency broadcast message. CBC 110 then sends a Write-Replace Warning Request to MME 112 that includes the emergency broadcast message. Before sending Write-Replace Warning Request to MME 112, CBC 110 may insert the class indicator into the Write-Replace Warning Request. MME 112 then forwards the Write-Replace Warning Request toward eNodeB 121. At this point, eNodeB 121 begins procedures for broadcasting the emergency broadcast message to UEs in a particular service area, which includes UE 130.

Figures 3, 4:
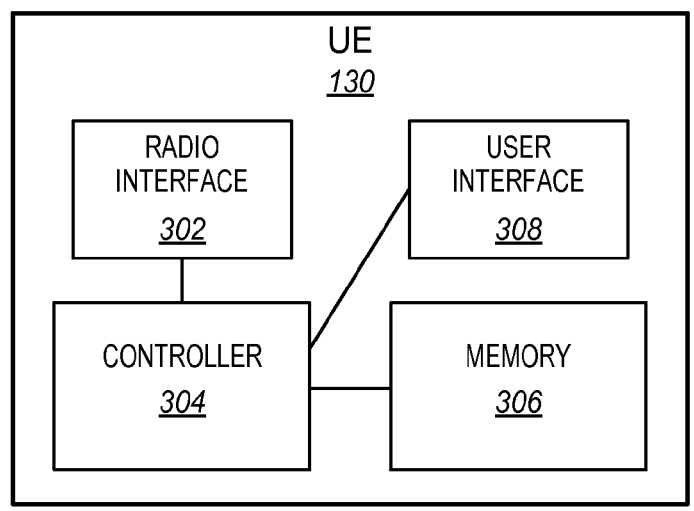
FIG. 3 is a schematic diagram of User Equipment (UE) in an exemplary embodiment.
FIG. 4 illustrates a class of rules provisioned in User Equipment (UE) for filtering emergency broadcast messages in an exemplary embodiment.

FIG. 3 is a schematic diagram of UE 130 in an exemplary embodiment. UE 130 includes a radio interface 302, a controller 304 (including a processor), a memory 306, and a user interface 308. Radio interface 302 represents the local radio resources of UE 130, such as a transceiver and an antenna, used for wireless communications to exchange over-the-air signals. Controller 304 represents the internal circuitry, logic, hardware (e.g., a processor), software, etc., that provides the functions of UE 130. In this embodiment, UE 130 (through controller 304) is enabled for an emergency alerting service, such as CMAS. Memory 306 is a storage unit for data, instructions, applications, etc., and is accessible by controller 304. User interface 308 represents the mechanisms used to interact with a user of UE 130. User interface 308 may include an input mechanism, such as a keypad or touch screen. User interface 308 may also include an output mechanism, such as a display, a speaker, etc.

UE 130 is configured to filter emergency broadcast messages that are received from the mobile network. Thus, UE 130 is pre-provisioned with rules for filtering the emergency broadcast messages. FIG. 4 illustrates a class of rules provisioned in UE 130 in an exemplary embodiment. In the example shown in FIG. 4, a class indicator is mapped to a rule. For example, a class indicator of "0" is mapped to a rule for processing the message in a normal fashion. If a class indicator of "0" is assigned to an emergency broadcast message, then the rule defines that UE 130 is to process the message in a normal manner. This will include extracting the content from the emergency broadcast message, and displaying the content to an end user through user interface 308.

A class indicator of "1" is mapped to a rule for ignoring the message. If a class indicator of "1" is assigned to an emergency broadcast message, then the rule defines that UE 130 is to ignore the message. Therefore, the content of the emergency broadcast message will not be displayed to the end user.

A class indicator of "2" is mapped to a rule for processing the message if one or more conditions are met. The conditions may include the sender or source of the message or content of the message, the type of message, the type of UE, time of day, day of the week, location of the UE (e.g., at home versus traveling), etc. For example, the rule may be that the message is processed in UE 130 if the sending application is "ESPN" or "Fox Sports". UE 130 will process the conditions indicated in the rule to determine whether or not the emergency broadcast message is authorized for display to the end user. If the conditions are met, then UE 130 may process the message in a normal manner. If the conditions are not met, then UE 130 may ignore the message.

Figure 5:
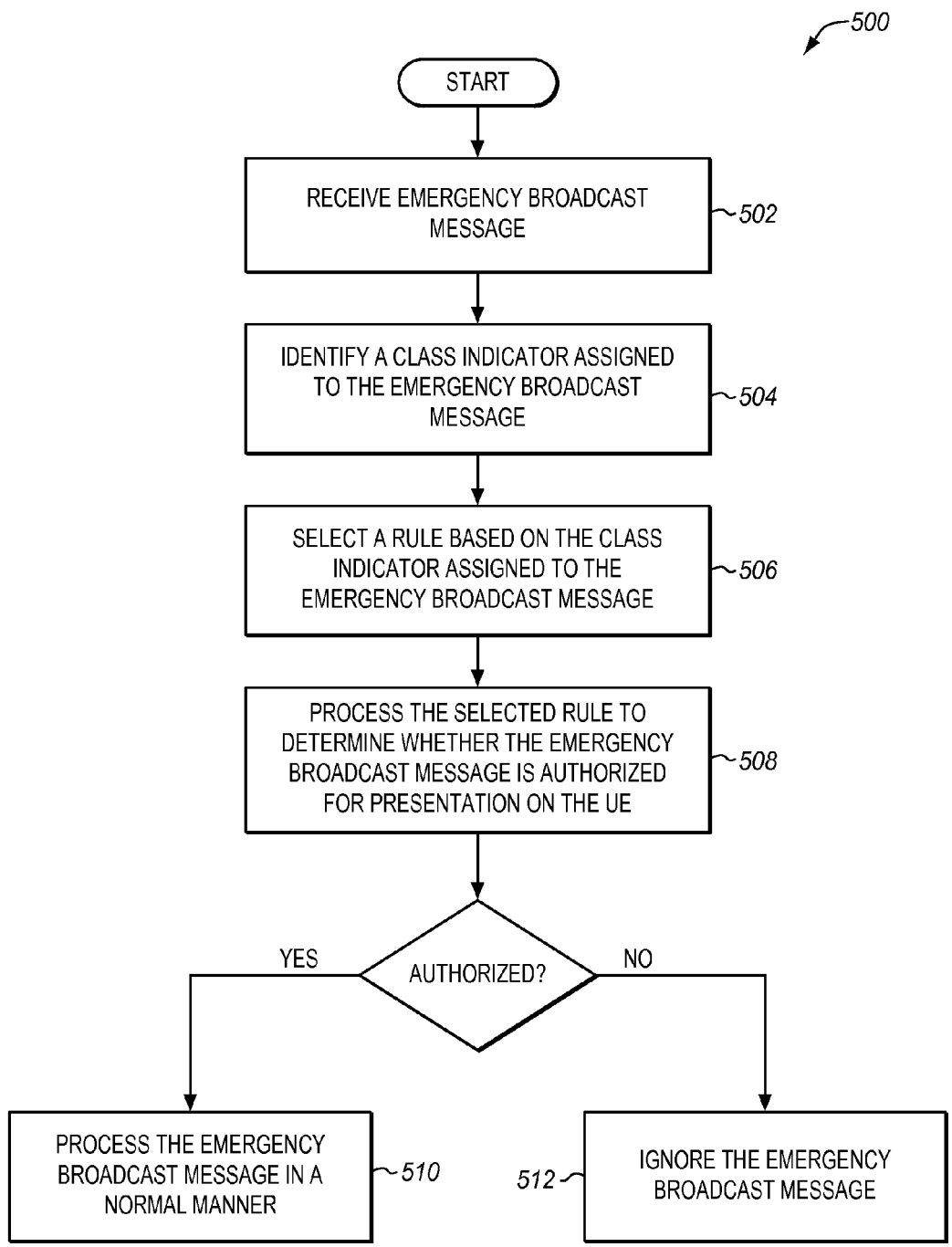
FIG. 5 is a flow chart illustrating a method for filtering emergency broadcast messages in an exemplary embodiment.

FIG. 5 is a flow chart illustrating a method 500 for filtering emergency broadcast messages in an exemplary embodiment. The steps of method 500 will be described with reference to UE 130 in FIGS. 1 and 3, but those skilled in the art will appreciate that method 500 may be performed in other systems. Also, the steps of the flow charts described herein are not all inclusive and may include other steps not shown, and the steps may be performed in an alternative order.

To begin, controller 304 in UE 130 receives the emergency broadcast message from eNodeB 121 through radio interface 302 (step 502). The emergency broadcast message is sent to UE 130 over a paging channel of a mobile network. A paging channel is used in mobility management to locate a UE for a communication. For example, LTE defines three categories of channels, which are physical channels, transport channels, and logical channels. Physical channels are transmission channels that carry user data and control messages (uplink and downlink). Transport channels offer information transfer to Medium Access Control (MAC) and higher layers. Logical channels provide services for the MAC layer within the LTE protocol structure. A paging channel in LTE may be over a Physical Downlink Shared Channel (PDSCH), a Paging Channel (PCH) of the transport layer, and a Paging Control Channel (PCCH) of the logical layer. Emergency broadcast messages are broadcast over a paging channel to UEs within a particular area.

Controller 304 identifies a class indicator assigned to the emergency broadcast message (step 504). The class indicator for the emergency broadcast message may be provided to UE 130 in different ways. For example, the class indicator may be provided in a paging message that precedes the emergency broadcast message, may be provided in a System Information message for the emergency broadcast message, or may be provided in another way. Because UE 130 is provisioned with a class of rules for the emergency broadcast messages, controller 304 is able to select one of the rules based on the class indicator that is assigned to the emergency broadcast message (step 506). Controller 304 then processes the selected rule to determine whether the emergency broadcast message is authorized for presentation on UE 130 (step 508).

If the emergency broadcast message is authorized for presentation based on the rule, then controller 304 processes the emergency broadcast message in a normal manner (step 510). For example, controller 304 will extract the content from the emergency broadcast message, and present the content to an end user through user interface 308. The end user will then be able to view the content of the emergency broadcast message.

If the emergency broadcast message is not authorized for presentation based on the rule, then controller 304 ignores the emergency broadcast message (step 512). When controller 304 ignores the emergency broadcast message, it alters the normal procedure for processing an emergency broadcast message so that the message is not displayed or otherwise presented to the end user. For instance, controller 304 may block certain Radio Resource Control (RRC) procedures so that applications in UE 130 do not decode and present the emergency broadcast message. In an LTE system, the network layer uses System Information messages to provide information about the emergency broadcast message. A System information message includes one or more System Information Blocks (SIB). SIB Type 1 (SIB1) in a System information message includes scheduling information for other SIBs. SIB Type 12 (SIB12) provides a notification (e.g., a CMAS notification) that an emergency broadcast message is arriving. When the emergency broadcast message is not authorized, controller 304 may ignore SIB1 of the System information message, which indicates that the emergency broadcast message is arriving. Because SIB1 is ignored, controller 304 does not know that an emergency broadcast message is arriving, and the message is not presented on UE 130.

When the emergency broadcast message is authorized as in step 510, controller 304 processes SIB1 of the System information message to identify SIB12 (which indicates that an emergency broadcast message is arriving). Controller 304 then processes SIB12 to extract content for the emergency broadcast message from an upper layer (e.g., a transport layer, such as a TCP or UDP layer). Controller 304 then displays the content from the emergency broadcast message through user interface 308.

Through the rules that are provisioned on UE 130, it is able to filter emergency broadcast messages that are received over the paging channel. For example, if an emergency broadcast message is for a weather alert, then UE 130 may display the weather alert to an end user. However, if an emergency broadcast message is for a commercial advertisement, then UE 130 may filter the message so that the advertisement is not displayed to the end user. Therefore, an end user may not be annoyed by commercial content that is broadcast using an emergency alerting service.

In the above embodiment, a class indicator is provided to UE 130 that is associated with an emergency broadcast message. The network may provide the class indicator to UE 130 using different RRC signaling messages (Layer 3). In one embodiment, the network may provide the class indicator for an emergency broadcast message (e.g., CMAS) to UE 130 in a paging message of RRC. A CMAS notification can occur at any point in time. A paging message is used to inform CMAS-capable UEs in RRC_IDLE and RRC_CONNECTED mode about the presence of one or more CMAS notifications. Thus, when eNodeB 121 generates a paging message for the emergency broadcast message, it may insert the class indicator in the paging message along with an indication (e.g., a cmas-Indication) of the emergency broadcast message in a non-critical extension field. The following illustrates a class indicator inserted in a paging message as "cmas-Class-ID":

```
Paging ::=                SEQUENCE {
pagingRecordList              PagingRecordList        OPTIONAL,-- Need ON
systemInfoModification        ENUMERATED {true}       OPTIONAL,-- Need ON
etws-Indication               ENUMERATED {true}       OPTIONAL,-- Need ON
cmas-Indication-r9            ENUMERATED {true}       OPTIONAL,-- Need ON
cmas-Class-ID                 Paging-IEs              OPTIONAL,
nonCriticalExtension          Paging-IEs              OPTIONAL
}
```

If UE 130 receives the paging message that includes a cmas-Indication, then controller 304 in UE 130 may process the paging message to extract the class indicator (i.e., cmas-Class-ID) from the paging message. Controller 304 may then select a rule based on the class indicator for filtering the emergency broadcast message.

In another embodiment, the network may provide the class indicator for an emergency broadcast message to UE 130 in a System information message sent over the PDSCH channel. System information is divided into the Master Information Block (MIB) and a number of System Information Blocks (SIBs). The MIB includes the most essential and most frequently-transmitted parameters that are needed to acquire other information from the cell, and is transmitted on the Broadcast Channel (BCH). SIBs other than SIB1 are carried in System Information (SI) messages. Mapping of SIBs to System information messages is flexibly configurable by a scheduling information list that is included in SIB1. The network (e.g., eNodeB) may insert the class indicator in SIB1 of a System information message (possibly in an extension field). The following illustrates a class indicator inserted in SIB1 as "cmas-Class-ID":

```
SystemInformationBlockType1 ::=  SEQUENCE {
    cellAccessRelatedInfo          SEQUENCE {
        plmn-IdentityList              PLMN-IdentityList,
        trackingAreaCode               TrackingAreaCode,
        cellIdentity                   CellIdentity,
        cellBarred                     ENUMERATED {barred, notBarred},
        intraFreqReselection           ENUMERATED {allowed, notAllowed},
        csg-Indication                 BOOLEAN,
        csg-Identity                       CSG-Identity      OPTIONAL
    },
    cellSelectionInfo              SEQUENCE {
        q-RxLevMin                     A-RxLevMin,
        q-RxLevMinOffset               INTEGER (1..8)
    },
    p-Max                          P-Max,
    freqBandIndicator              FreqBandIndicator,
    schedulingInfoList             SchedulingInfoList,
```

| | |
|---|---|
| tdd-Config | Tdd-Config, |
| si-Windowlength | ENUMERATED { |
| | ms1, ms2, ms5, ms10, ms15, ms20, ms40}, |
| systemInfoValueTag | INTEGER (0..31), |
| cmas-Class-ID | SystemInformationBlockType1 - IEs OPTIONAL |
| nonCriticalExtension | SystemInformationBlockType1 - IEs OPTIONAL |
| } | |

If UE 130 receives the System information message, it may process SIB1 to extract the class indicator (cmas-Class-ID) for the emergency broadcast message. Controller 304 may then select a rule based on the class indicator from the System information message for filtering the emergency broadcast message.

Although the above embodiment was described in relation to an LTE system, the systems and methods described herein may be used in any type of mobile network that utilizes an emergency alert service to broadcast emergency messages to mobile devices in a service area.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

We claim:

1. An apparatus comprising:
User Equipment (UE) having a controller configured to store rules for filtering emergency broadcast messages;
the controller is configured to receive an emergency broadcast message over a paging channel of a mobile network, to identify a class indicator assigned to the emergency broadcast message, to select one of the rules based on the class indicator assigned to the emergency broadcast message, to determine whether the emergency broadcast message is authorized for presentation on the UE based on the rule, and to ignore the emergency broadcast message responsive to a determination that the emergency broadcast message is not authorized for presentation;
wherein the controller is configured to receive a first System information message used in Radio Resource Control (RRC) for the emergency broadcast message, and to ignore System Information Block Type 1 (SIB1) of the first System information message responsive to a determination that the emergency broadcast message is not authorized for presentation.

2. The apparatus of claim 1 wherein:
the controller is configured to receive a paging message from the mobile network for the emergency broadcast message, and to extract the class indicator from the paging message.

3. The apparatus of claim 2 wherein:
an extension field is added to the paging message for the class indicator assigned to the emergency broadcast message.

4. The apparatus of claim 1 wherein:
the controller is configured to extract the class indicator from System Information Block Type 1 (SIB1) of a second System information message.

5. The apparatus of claim 4 wherein:
a SIB1 extension field is added to the second System information message for the class indicator assigned to the emergency broadcast message.

6. The apparatus of claim 1 wherein:
the controller is configured to process the emergency broadcast message responsive to a determination that the emergency broadcast message is authorized for presentation.

7. The apparatus of claim 6 wherein:
the controller is configured to extract content from the emergency broadcast message, and to present the content to an end user through a user interface.

8. A method for filtering emergency broadcast messages, the method comprising:
storing, within User Equipment (UE), rules for filtering the emergency broadcast messages;
receiving an emergency broadcast message in the UE over a paging channel of a mobile network;
identifying, at the UE, a class indicator assigned to the emergency broadcast message;
selecting, at the UE, one of the rules based on the class indicator assigned to the emergency broadcast message;
determining whether the emergency broadcast message is authorized for presentation on the UE based on the rule; and
ignoring, at the UE, the emergency broadcast message responsive to a determination that the emergency broadcast message is not authorized for presentation;
wherein ignoring the emergency broadcast message comprises:

receiving a first System information message used in Radio Resource Control (RRC) for the emergency broadcast message; and ignoring System Information Block Type 1 (SIB1) of the first System information message responsive to a determination that the emergency broadcast message is not authorized for presentation.

9. The method of claim 8 wherein identifying the class indicator assigned to the emergency broadcast message comprises:

receiving a paging message from the mobile network for the emergency broadcast message; and extracting the class indicator from the paging message.

10. The method of claim 9 wherein:

an extension field is added to the paging message for the class indicator assigned to the emergency broadcast message.

11. The method of claim 8 wherein identifying the class indicator assigned to the emergency broadcast message comprises:

extracting the class indicator from System Information Block Type 1 (SIB1) of a second System information message.

12. The method of claim 11 wherein:

a SIB1 extension field is added to the second System information message for the class indicator assigned to the emergency broadcast message.

13. The method of claim 8 further comprising:

processing the emergency broadcast message responsive to a determination that the emergency broadcast message is authorized for presentation.

14. The method of claim 13 wherein processing the emergency broadcast message comprises:

extracting content from the emergency broadcast message; and presenting the content to an end user.

15. An apparatus comprising:

User Equipment (UE) enabled for Long Term Evolution (LTE) communications;

the UE including a controller configured to store a class of rules for filtering Commercial Mobile Alert System (CMAS) messages;

the controller is configured to receive a CMAS message broadcast from an eNodeB, to identify a class indicator assigned to the CMAS message, to select a rule based on the class indicator assigned to the CMAS message, and to determine whether the CMAS message is authorized for presentation on the UE based on the rule;

when the CMAS message is not authorized for presentation, the controller is configured to ignore a System Information Block Type 1 (SIB1) of a System information message received from the eNodeB used in Radio Resource Control (RRC) for the CMAS message.

16. The apparatus of claim 15 wherein:

when the CMAS message is authorized for presentation, the controller of the UE is configured to process SIB1 of the System information message to identify a System Information Block Type 12 (SIB12), to process SIB12 to extract content for the CMAS message from an upper layer, and to display the content through a user interface.

17. The apparatus of claim 15 wherein:

the controller of the UE is configured to receive a paging message from the eNodeB for the CMAS message, and to parse the paging message to identify the class indicator assigned to the CMAS message.

18. The apparatus of claim 15 wherein:

the controller of the UE is configured to parse SIB1 of the System information message to identify the class indicator assigned to the CMAS message.

* * * * *